No. 869,062. PATENTED OCT. 22, 1907.
A. E. CRANSTON.
COMBINED WAGON BOX, HEADER BOX, HAY AND STOCK RACK.
APPLICATION FILED FEB. 23, 1906.
2 SHEETS—SHEET 1.
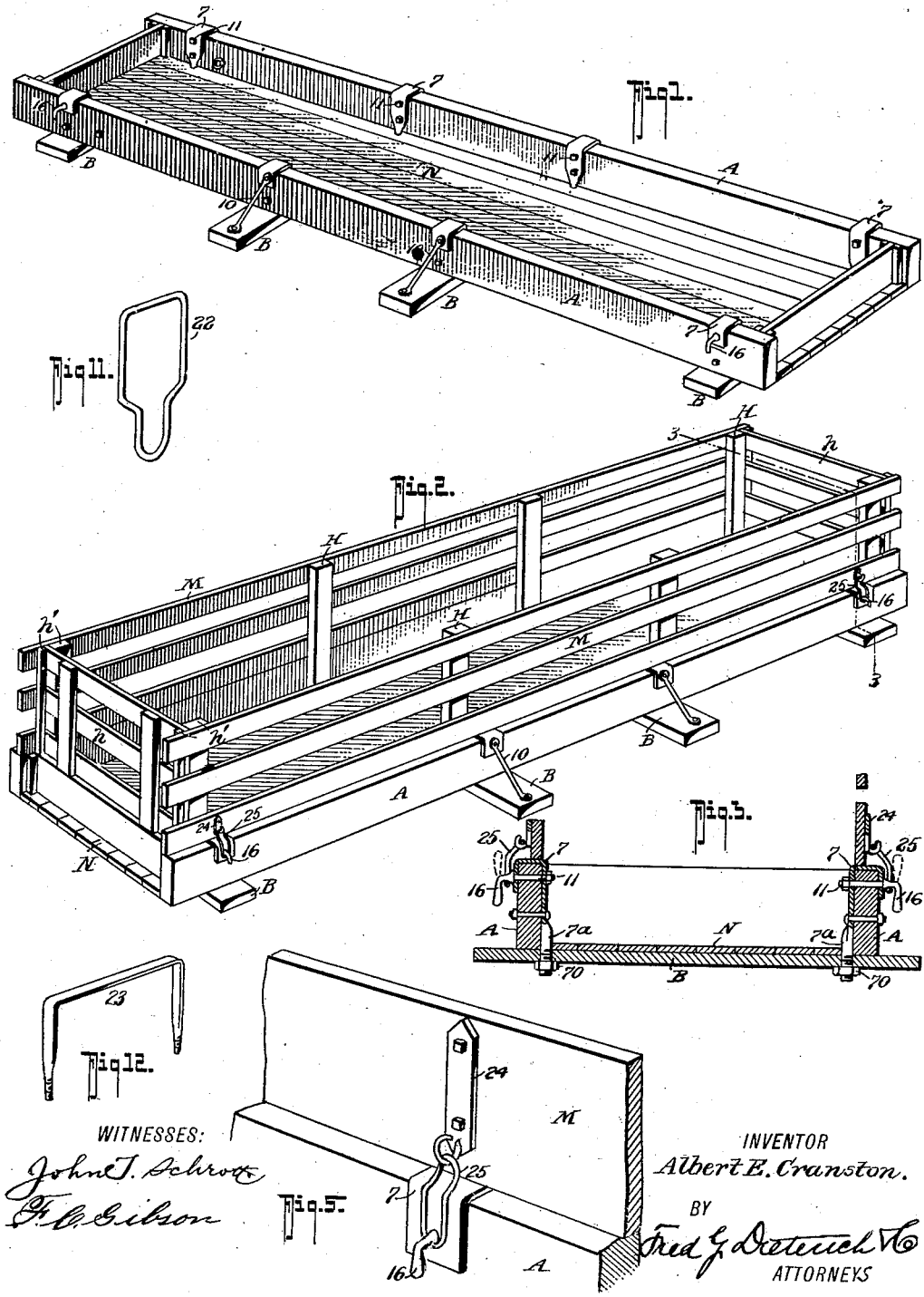
WITNESSES:
John T. Schrock
F. C. Gibson
INVENTOR
Albert E. Cranston.
BY
Fred G. Dieterich & Co
ATTORNEYS No. 869,062. PATENTED OCT. 22, 1907.
A. E. CRANSTON.
COMBINED WAGON BOX, HEADER BOX, HAY AND STOCK RACK.
APPLICATION FILED FEB. 23, 1906.
2 SHEETS—SHEET 2.
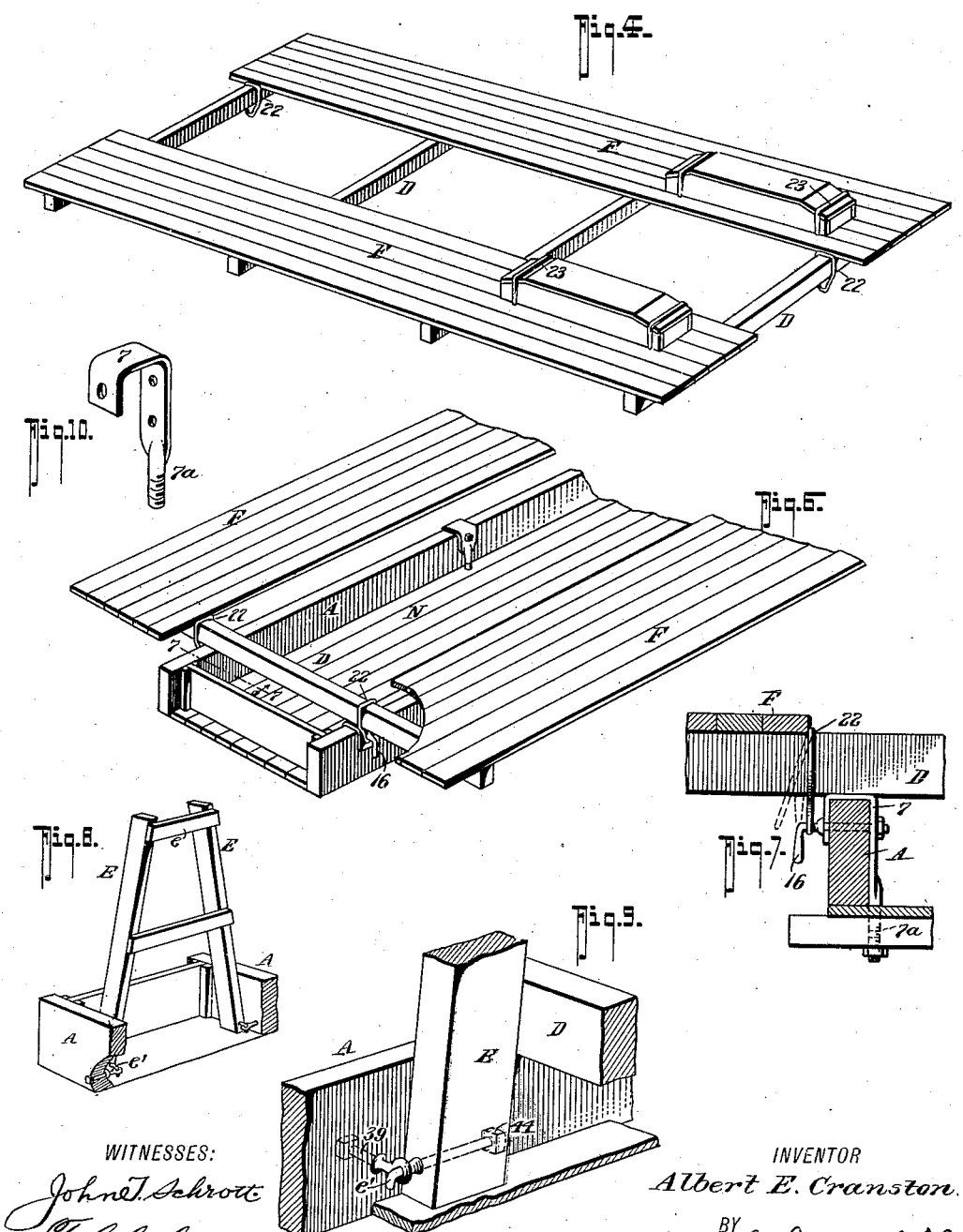
WITNESSES:
INVENTOR
Albert E. Cranston.
BY
ATTORNEYS.

UNITED STATES PATENT OFFICE.

ALBERT E. CRANSTON, OF POLLOCK, SOUTH DAKOTA.

COMBINED WAGON-BOX, HEADER-BOX, HAY AND STOCK RACK.

No. 869,062.  Specification of Letters Patent.  Patented Oct. 22, 1907.

Application filed February 23, 1906. Serial No. 302,517.

*To all whom it may concern:*

Be it known that I, ALBERT E. CRANSTON, residing at Pollock, in the county of Campbell and State of South Dakota, have invented a new and Combined Wagon-Box, Header-Box, Hay and Stock Rack, of which the following is a specification.

My present invention seeks to provide a new and improved, coöperative arrangement of parts, adapted to be interchangeably connected with a wagon box and combined therewith in such manner whereby the wagon box may readily be used for all purposes for which a wagon box is used and by means of which when desired, a stock rack or hay rack, or header box can be quickly and firmly secured upon the wagon box without the necessity of using a wrench or other special tool therefor.

Another and important feature of my invention lies in the peculiar construction of a series of irons adapted to be fixedly connected to the ordinary type of wagon box, in such manner as to not interfere with the regular use of the said wagon box, and to be coöperatively connected with and form an attaching means for securely fastening the hay or stock racks or the header box on the wagon body, and whereby to provide an inexpensive, easily understood set of irons or wagon box attachments that can in themselves be sold as separate articles of manufacture whereby with a set of my form of irons and the other material necessary, any farmer can conveniently make a strong and handy wagon box, a hay rack, a header box, and stock rack without the need of special tools or any skilled labor to assemble the parts.

My invention, in its subordinate features and details of construction, consists in certain details and peculiar combination of parts, all of which will hereinafter be fully described and pointed out in the claims and illustrated in the accompanying drawings, in which, Figure 1, is a perspective view of a wagon box which embodies the general features of my invention, Fig. 2, is a similar view with a stock rack detachably mounted thereon, Fig. 3, is a transverse section of the parts as arranged on Fig. 2 taken on the line 3—3 of Fig. 2. Fig. 4, is a perspective view illustrating the construction of the floor or hay rack, Fig. 5, is a detail view illustrating how the stock rack is made fast on the wagon box, Fig. 6, is a perspective view of a portion of the wagon box with the hay rack or header floor mounted thereon, Fig. 7, is a detail transverse section thereof on the line 7—7 on Fig. 6, Fig. 8, is a view illustrating the manner in which the ladder used in connection with the hay rack is made fast to the wagon box, Fig. 9, is a detail view of the lower end of one of the ladder standards and the means for securing same to the longitudinal box timber, Fig. 10, is a detail view of one of the clamp hooks 7, Fig. 11, is a similar view of the loop iron 22 hereinafter referred to, and, Fig. 12, is a detail view of one of the clip irons 23 that hold the wheel boxes.

In the practical application of my invention, when building an ordinary type of wagon box, the same may be made by using two side timbers A—A to which a number of hanger irons 7 are secured by the bolts 11 as clearly shown in Fig. 3, by reference to which it will be seen the iron 7 comprises a ⌐⌐ shaped upper end that fits over the upper edge of the timbers A—A and a lower reduced and threaded end 7ª adapted to pass through the cross bars or stringers B, to which the bottom boards N of the wagon box are nailed and which are firmly secured to the under side of the timbers A—A by the nuts 70 that engage the threaded irons 7. The upper ones of the fastening bolts that secure the irons 7 next the ends of timbers A—A at the head end have a crank finger or hook 16, the purpose of which will presently appear. To further brace the middle stringers or cross members B, brace rods 10 are used, clamped at the upper end by the bolts 11 and at the lower ends by bolts that secure said ends to the outer ends of the stringers B as clearly shown in Fig. 1.

The stock rack which is of the usual type comprising the sides formed of standards H, the horizontal bars M, and the end gates h—h which slidably fit between the cleats h' on the side members when fitted on the wagon box, has its standards H projected below the lowermost side bar M, so said bar will rest upon the upper edge of the side beams A of the wagon box and with the bottoms of the standards on the bottom of the wagon box. To securely fasten said rack on the wagon, the ends of the lowermost side bars M are provided with means for interlocking with the hook or crank member 16 of the fastening bolts 11 and such means consists of an iron plate 24 adapted to be secured or bolted to the side bar M (see Fig. 5) and having its lower end terminating in an eye to receive a bent link 25, the lower end of which is shaped to fit over the upper edge of the box timber A and over the hook 16 when the same is turned up, as shown in dotted lines on Fig. 3 and to be securely clamped down and made fast when said hook is turned down as shown in Fig. 3, thus providing a simple, and inexpensive means for quickly and without skill fitting the stock rack in place in the wagon body and which can be instantly removed by simply turning up the hooks 16 to allow for disengaging the links 25 therefrom.

In Fig. 4 I have shown an ordinary type of a header box or hay rack floor which consists of a number of cross beams D—D of suitable size to which are nailed the separated floor sections F—F which are centrally separated a distance slightly more than the width of the wagon box whereby the fastening loops 22, loosely mounted on each of the end cross bars D can be easily brought into position to engage with the hook ends 16 of the bolts 11 for positively holding the hay rack platform or bottom members D—D on the wagon timbers A—A and also for holding said members D—D from lateral displacement on the beams A—A, as clearly illustrated in Fig. 7.

In Fig. 8, I have illustrated the "ladder" generally used in connection with the hay rack, and the manner in which it is detachably joined with the wagon body. The ladder consists of two standards or timbers E—E inclined inwardly and connected at the upper end by the cross bars e—e and the hook members e' that pass through the lower ends of the timber E—E and are made fast by the nuts 44 as shown. The hook members e' fit into the eyes of bolts 39 secured to the side of 39 as clearly shown in Fig. 9, which firmly supports the ladder members E in their proper position and capable of being quickly removed.

23—23 designate clip irons that are used to fasten the wagon wheel boxes firmly on the header or hay rack bottom.

From the foregoing, taken in connection with the accompanying drawings, it is believed the complete combination of the several parts constituting my invention and the advantages thereof for the purposes stated will be readily understood.

It will be noticed that by reason of the structural arrangement of the several irons and their manner of connection with the wagon box, that the stock rack can be quickly fitted on the sides of the wagon, made fast thereon and as quickly lifted off without the removal of bolts or nuts or use of any tool, the same ease of applying or removing the hay or header platform being also provided for.

Having thus described my invention, what I claim and desire to secure by Letters Patent, is:—

1. As an improvement in wagon boxes and racks therefor; the combination with the side members A—A, the transverse bars B upon which the said members A rest, a clamping iron 7 having U-shaped upper ends for clamping over the upper edges of the box sides A—A and having their lower ends extended through the cross bars B and provided with clamp nuts for sustaining the said bars, the bolts rotatably mounted in the upper ends of the sides A—A and the U-shaped ends of the clamps, the said bolts having hook members 16—16, the loop or bail members loosely connected with the hooks and the supplemental wagon body portion adapted to be detachably sustained on the sides A—A of the wagon box, said supplemental wagon box having members arranged to be detachably engaged with the bail or loop members 25 for the purposes specified.

2. As an improvement in wagon boxes and racks therefor, the combination with the box which comprises the side members A, the transverse bars B, the flooring N, and the end gate cleats or guides, the clamp irons that secure the sides and cross members to the box, rotatable bolts 11 connected with the irons of the box having hook portions 16; of the stock rack comprising side bars M, vertical cleats H secured to the inside of the bars M and having their lower ends projected below the lowermost ones of said side bars M, the end gate cleats h' h' the end gates h slidable in the said cleats h' h', the hook irons 24 on the bottom members M and the loops 25 detachably connectible to the bolt hook ends and the hook irons 24, all being arranged substantially as shown and for the purposes described.

ALBERT E. CRANSTON.

Witnesses:
A. J. BROWN,
J. J. FENELON.